United States Patent [19]

Harrington

[11] Patent Number: 4,837,078
[45] Date of Patent: Jun. 6, 1989

[54] WET/DRY WIPES

[75] Inventor: James H. Harrington, Stone Mountain, Ga.

[73] Assignee: Hercules Incorporated, Wilmington, Del.

[21] Appl. No.: 134,287

[22] Filed: Dec. 17, 1987

[51] Int. Cl.$^4$ .............................................. B32B 27/00
[52] U.S. Cl. .................................... 428/284; 428/286; 428/287; 428/288; 428/296
[58] Field of Search ............... 428/284, 286, 287, 288, 428/296

[56] References Cited

U.S. PATENT DOCUMENTS

| | | | |
|---|---|---|---|
| 3,420,235 | 1/1969 | Harmon | 128/290 |
| 3,886,942 | 3/1970 | Bernardin | 128/290 |
| 3,916,447 | 11/1975 | Thompson | 2/46 |
| 4,203,435 | 5/1980 | Krull | 128/156 |
| 4,211,227 | 7/1980 | Anderson | 128/296 |
| 4,296,168 | 10/1981 | Ambrose | 428/288 |
| 4,355,066 | 10/1982 | Newman | 428/198 |
| 4,586,606 | 5/1986 | Honey | 206/313 |
| 4,741,944 | 5/1988 | Jackson | 428/284 |

Primary Examiner—Marion C. McCamish
Attorney, Agent, or Firm—John E. Crowe

[57] ABSTRACT

A wipe material capable of retaining opposed wet and dry facings characterized by (A) a wet facing comprising one or more fiber- or fiber-like-web(s) having hydrophilic/hydrophobic component blends of indicated wt. % ranges and denier and (B) a dry facing comprising one or more fiber- or fiber-like-webs containing one or more hydrophobic components of mixed denier not exceeding a given denier; and a method for obtaining the same.

12 Claims, No Drawings

WET/DRY WIPES

This invention is directed to a class of nonwoven wipe materials which retain separate wet and dry faces, and are individually capable of carrying out sequential wet and dry wiping steps.

BACKGROUND

The use of low cost composites of fiber webs to form disposable wipes for dusting, polishing and minor household cleanup projects involving dry wipe or wet wipe activity, is well known and widely accepted by the public. Such wipes are commonly commercialized in the form of napkins, roll toweling, disposable handkerchiefs and the like.

It is found, however, that smearing often occurs when carrying out individual projects involving both wet and dry wipe activities unless several wipes are utilized to complete the job. In effect, most art-recognized wipes are individually unsuitable for accomplishing wet and dry wipe operations in sequence without smearing and/or structural failure.

A typical example of such practical dual use might involve, for instance, cleaning up wet dumped soil from a potted plant or carrying out heavy dusting of a glass top table surface on which several wet spills have been left. In both situations at least one and often several additional wipes are required to accomplish the job.

It is an object of the present invention to increase the efficiency and versatility of wipes.

It is a further object of the instant invention to promote separate wet and dry facings on opposite sides of a single disposable nonwoven wipe or towel (hereafter "wipe").

It is a still further object of the present invention to obtain a durable wipe suitable for sequential wet and dry cleaning operations.

THE INVENTION

Wipe material capable of realizing the above objects is obtained by bonding together (A0 a wet facing consisting essentially of one or more externally positioned and internally positioned fiber- or fiber-like-web, preferably up to about 4 webs, of blende hydrophilic/hydrophobic components totaling about 50-90/50-10 wt. % and preferably 50-75/50-25 wt. % respectively, based on total web weight for the wet facing, the hydrophilic component of each web of the wet facing having a denier within a range of about 0.5-2.0 dpf, and the hydrophobic component of each web of the wet facing having a denier not exceeding about 6 dpf, and preferably about 0.5-6 dpf; wherein (a) the externally-positioned web of the wet facing contains not less than about 60 wt. % of the hydrophilic component, and fiber- or fiber-like-components thereof are of about the same denier; and (b) the internally-positione web(s) of the wet facing contain fiber- or fiber-like-components of mixed denier, particularly, although not exclusively, favoring increased differences in denier between fibers as one approaches the center of the wipe; with (B) a dry facing of one or more webs comprising one or more hydrophobic fiber- or fiber-like-components of mixed denier not exceeding about 6 dpf and preferably within the range of about 0.5-6 dpf.

For present purposes the above-defined wet (A) and dry (B) facings are usefully bonded together from one or more webs of fiber and/or fibrillated films of carded and/or prebonded web combinations, using art-recognized nonwoven bonding techniques such as thermal, sonic, and/or pressurebonding techniques or equivalent techniques known to the art, and may be embossed and printed conventionally with various designs and colors, as desired, to increase loft, wipe strength and for easy recognition of the wet and dry sides of the wipe for functional purposes.

Wipes within the scope of the present invention are further conveniently represented schematically, for instance, as cut away cross sections in the following three diagrams, (I-III), representing individual wipes comprising 2-7 webs of fiber- or fiber-like-components which are not drawn to scale:

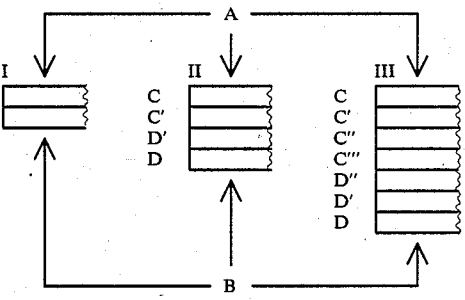

and in which the "A" denotes the wet facing side and the "B" side denotes the dry facing side of each wipe as above noted.

For present purposes the "A" wet facing side, conveniently, although not exclusively, comprises about 1-4 webs of blended hydrophilic/hydrophobic components, the webs of this facing being represented individually in diagrams I-III as C, C', C'' and C''', while the "B" dry facing, is nonexclusively represented as 1-3 webs, identified in the diagrams as D, D' and D''.

For purposes of the instant invention, the wipes represented by the above diagrams are also differentiated as "internally-positione fiber- or fiber-like-webs" demonstrated by C' and D' of diagram II and C', C'', C41 ' D'', D' of diagram III, and as "externally-positioned fiber- or fiber-like-web" represented by C and D in diagrams II-III.

The above differentiation can also be duplicated, as desired, within components C and D of diagram 1, in which individual web laminates of Diagram II and III are replaced by sequential application of thin layers of unbonded, uncrimped or slightly crimped fiber blends (not shown) of one or more of the above-indicated types and sequences, followed by a bonding step. Generally speaking, the later arrangement is best suited for light weight wipes and easy clean up jobs.

In either case, an externally-positioned web of a wet facing (i.e. C) should favor a high wt. % of hydrophilic component of not less than about 60 wt. %, and preferably 90-100% with a homogeneous or relatively small difference in fiber denier within the web, while corresponding internally-positioned webs (i.e., C', C'', C''', of diagrams II and III) should favor a sufficient increase in hydrophobic fiber to meet the above-indicated 50-90/-50-10 wt. % total and a gradually increasing difference in fiber denier within each web blend as one approaches the center of the wipe.

Particularly favored as blended hydrophilic/hydrophobic components for wet facing webs C, C', C", C''' of the instant invention are rayon/polyolefin, nylon/polyolefin, cotton/polyolefin and acrylic/polyolefin fiber or filament blends, or combinations thereof alone or with corresponding fiber-like components exemplified by fibrillated films such as polyolefin film.

Generally speaking, web weight making up the wet facing of a wipe possess strong wicking and liquid retention properties and can usefully vary from about 20 to 40 gm/yd$^2$, depending upon intended use, while hydrophobic webs exhibit strong liquid capillary effects but no significant liquid retention properties internally. These can usefully vary in weight from about 20 to 60 gm/yd$^2$.

The half wipe or dry facing of wipes within the scope of the instant invention is further characterized by up to 5 or more webs (but preferably 1-3 as shown in the above diagrams), each of which comprises hydrophobic fiber- or fiber-like web components of mixed denier, which can be obtained by carding or precarding and preferably contains about 85-100 wt. % polyolefin such as isotactic polypropylene homopolymer or copolymer; the balance, as desired, can be usefully in the form of other bondable hydrophobic fiber- or fiber-like material such as polyethylene and/or polyester fiber.

Within webs comprising the dry facing it is also preferred that differences in denier of hydrophobic fiber within each web be minimized in externally positioned webs such as web D (diagrams II-III supra) and that corresponding internally positioned dry facing webs such as D' (diagram II) or D', D" (diagram III) exhibit only a slightly wider mixed denier range as one approaches the center of the wipe, so as to augment liquid retention properties without adversely affecting surface capillary properties.

Webs used in the present invention, can be formed from conventionally spun fibers or filaments having cross-sectional configurations such as round, "Y", delta, lobed, diamond shape or the like, as well as irregular fiber-like materials obtained in the form of fibrillated films of hydrophilic and/or hydrophobic types, provided that the above-indicated concentration and denier ranges are observed.

Generally speaking, the combined web weight of wipes within the scope of the present invention can usefully vary from about 40-100 gm/yd$^2$ and about 10-50 mil in thickness, again depending upon intended use.

Wipes can be embossed, as above noted, using one or more embossing wheels arranged in series or in opposition to further augment wipe strength, loft and liquid retention properties.

It is also found convenient to identify the "wet" and dry sides by printing and/or color differences as desired.

The following examples further illustrate but do not limit the present invention:

EXAMPLE 1

(A) 11"×11" half wipes (wet facing) are prepared in a conventional manner by carding fiber webs of blended 65/35 wt/ % rayon/isotactic polypropylene staple (1.5") of circular cross-sectional configuration having respective deniers of 1.5 dpf and 2.2 dpf. Two (2) webs of the above-blended hydrophilic/hydrophobic fiber are conventionally thermally bonded at 157°-168° C. at 20-30 psig, using a heated calendar of diamond design to obtain wet facings to be laminated to various dry facing combinations for test purposes.

(B) 11"×11" half wipe (dry facing) are prepared in a conventional manner by carding and calender bonding test webs using blends of 1-3 dpf isotactic polypropylene staple (1.5"). The webs, arranged in 1-5 web laminates are individually bonded at 155°-160° C. at 20-30, psig then laminated by ultrasonic bonding to a 2 web facing prepared in A supra. The resulting test wipe is evaluated with respect to wet strength, sink time, absorbency, wipeability and linting in accordance with conventional tests and as described in C below, the test results being reported in Table 1 below.

(C) Evaluation tests, as hereafter described, are carried out using the test wipes prepared in accordance with A and B supra:

(i) Sink Time (ASTM D117-79 method)

A 5 gram sample of test wipe is rolled and placed in a metal open weave basket of known weight and lowered into a tank of distilled water at ambient temperature. The time required for the sample to completely submerge below the surface is recorded in seconds.

(ii) Absorbency Capacity ASTM D117-77 method)

The basket containing the 5 gram sample of C(i) supra is pulled out of the tank and the basket and wipe allowed to drain for 10 seconds and then weighed. The difference in weight over the basket plus a 5 gram dry sample is reported as absorbency capacity in gm water/gm wipe material.

(iii) Wipeability

Using the fabric liquid holding capacity of a particular wipe batch (see ii supra) as a basis, a 10%, 25%, 50% and 75% weight of distilled water is separately placed on a glass plate surface. Using a tared dry wipe and a one (1) minute circular motion the liquid is wiped up. The wipe and absorbed water are then weighed (within 30 seconds) and the difference noted over the dry wipe. The results are reported as grams of water (gm) residue on the glass plate surface.

(iv) Linting

The weight of the glass plate of C (iii) after all water evaporates off is weight, in situ, and the difference recorded as average weight/in mg/ft$^2$.

(v) Wet Cross-Directional Tensile Strength)

Conventionally determined (ref Table I column 3).

TABLE 1

| Sample | Dry Facing[4] Construction | CD Wet[3] Strength | Wipe Fabric Wt.[3] (Gm/yd$^2$) | Sink[3] Time (Sec) | Absorbency Cap[3] gm/gm | Wipeability[3] gm water residue/gm wipe | | | | Linting[3] mg |
|---|---|---|---|---|---|---|---|---|---|---|
| | | | | | | 10% | 25% | 50% | 75% | |
| S-1 | 1 web pp/1 dpf | 478.3 | 63.6 | 3.4 | 7.6 | 0.2 | 0.3 | 0.4 | 0.8 | 0.2 |
| S-2 | 2 webs pp/1 dpf | 1197.5 | 84.5 | 2.5 | 6.1 | 0 | 0.2 | 0.6 | 0.8 | 0.2 |
| S-3 | 3 webs pp/1 dpf | 1181.2 | 105.4 | 2.6 | 6.0 | 0 | 0.2 | 0.3 | 0.7 | — |
| S-4 | 1 web pp/2 dpf | 706.5 | 62.6 | 3.3 | 7.1 | 0.1 | 0.2 | 0.4 | 0.5 | 0.1 |
| S-5 | 2 webs pp/2 dpf | 1531.0 | 82.5 | 2.8 | 6.3 | 0.1 | 0.2 | 0.4 | 1.0 | 0.1 |
| S-6 | 3 webs pp/2 dpf | 1906.5 | 102.4 | 2.6 | 5.7 | 0.0 | 0.2 | 0.4 | 1.0 | — |

TABLE 1-continued

| Sample | Dry Facing*4 Construction | CD Wet*3 Strength | Wipe Fabric Wt.*3 (Gm/yd²) | Sink*3 Time (Sec) | Absorbency Cap*3 gm/gm | Wipeability*3 gm water residue/gm wipe | | | | Linting*3 mg |
|---|---|---|---|---|---|---|---|---|---|---|
| | | | | | | 10% | 25% | 50% | 75% | |
| S-7 | 1 web pp/3 dpf | 2588.6 | 62.4 | 2.3 | 7.3 | 0.1 | 0.1 | 0.5 | 1.1 | — |
| S-8 | 2 webs pp/3 dpf | 1129.8 | 82.1 | 2.6 | 6.1 | 0.0 | 0.2 | 0.5 | 0.8 | — |
| S-9 | 3 webs pp/3 dpf | 2100.3 | 101.8 | 2.6 | 5.1 | 0.0 | 0.2 | 0.3 | 0.6 | — |
| S-10 | 3 webs pp/3 dpf 2 dpf/1 dpf*3 | 2082.1 | 103.2 | 3.3 | 5.3 | 0.2 | 0.2 | 0.5 | 0.7 | 0.2 |
| S-11 | 3 webs pp/1 dpf 2 dpf/3 dpf | 1881.3 | 103.2 | 2.6 | 5.5 | 0.0 | 0.1 | 0.2 | 0.0 | — |
| S-12 | | 2381.6 | 81.8 | 17.4 | 3.7 | 0.1 | 0.1 | 0.3 | 0.6 | 0.0 |
| S-13 | 5 webs pp/1 dpf/ 2 dpf/3 dpf/2 dpf/ 1 dpf | 2072.5 | 101.3 | 2.8 | 6.0 | 0.1 | 0.2 | 0.5 | 0.6 | 0.1 |
| S-14 | 3 webs pp/1 dpf/ 3 dpf/1 dpf | 1151.4 | 61.5 | 2.6 | 7.3 | 0.0 | 0.2 | 0.3 | 1.1 | 0.2 |
| Control 1 | Bounty ™ Toweling*1 | (negligible) | 40.4 | 4.3 | 10.4 | 0.0 | 0.1 | 0.3 | 0.4 | 0.1 |
| Control 2 | K.C. Blue Toweling*2 | | 72.2 | 3.5 | 6.4 | 0.1 | 0.1 | 0.5 | 0.8 | 0.2 |
| Control 3 | Maraton ™ *5 | | 41.2 | 5.6 | 6.3 | — | 0.1 | 0.8 | 1.1 | 0.2 |

*1Paper obtained commercially from Scott Paper Company.
*2Melt blown pp obtained from Kimberly Clark Company.
*3Based on total wipe.
*4Bonded to 65/35 wt. % rayon/polypropylene wet facing as described.
*5Paper wipe obtained commercially from ──────────.

What I claim and desire to protect by Letters Patent:

1. A wipe material comprising in combination,
   (A) a wet facing consisting essentially of one or more externally positioned and internally positioned fiber-and/or fibrillated film-web of blended hydrophilic/hydrophobic components totaling about 50-90/50-10 wt. % respectively, the hydrophilic component of each web of said wet facing having a denier within a range of about 0.5-2.0 dpf, and the hydrophobic component of each web of said wet facing having a denier not exceeding about 6 dpf; wherein
      (a) said externally-positioned web of said wet facing contains not less than about 60 wt. % of said hydrophilic component, and fiber- and/or fibrillated film-components thereof are of about the same denier; and
      (b) said internally-positioned web(s) of said wet facing contain fiber- and/or fibrillated film-components of mixed denier; secured to
   (B) a dry facing consisting essentially of one or more webs comprising one or more hydrophobic fiber- and/or fibrillated film-components of mixed denier not exceeding about 6 dpf.

2. A wipe material of claim 1, wherein the wet facing comprises about 1-4 webs containing a blend of hydrophilic/hydrophobic fiber- and/or fibrillated film-components totaling about 50-75/50-25 wt %.

3. A wipe material of claim 1, wherein the wet facing comprises about 1-4 webs containing a blend of rayon/polyolefin components and the dry facing comprises one or more webs of a polyolefin fiber- and/or fibrillated film-component.

4. A wipe material of claim 1 wherein the wet facing comprises about 1-4 webs containing a blend of nylon/polyolefin components and the dry facing comprises one or more web of a polyolefin fiber- and/or fibrillated film-component.

5. A wipe material of claim 1, wherein the wet facing comprises about 1-4 webs of containing a blend of cotton/polyolefin components and the dry facing comprises one or more webs of a polyolefin fiber- and/or fibrillated film-component.

6. A wipe material of claim 1, wherein the wet facing comprises about 1-4 webs containing a blend of acrylic/polyolefin components and the dry facing comprises one or more webs of a polyolefin fiber- and/or fibrillated film-component.

7. A wipe material of claim 1, wherein the dry facing comprises up to about 5 or more webs consisting of polyolefin fiber- and/or fibrillated film-components having a substantially homogeneous denier within about 0.5-6 dpf.

8. A wipe material of claim 1, wherein the dry facing comprises about 1-3 webs consisting of polyolefin fiber- and/or fibrillated film components having a mixed denier within about 0.5-6 dpf.

9. A wipe material of claim 1, wherein the dry facing comprises a web utilizing a fiber mixture of delta and round cross-sectional configuration.

10. A wipe material of claim 1, wherein the wet facing comprises a web utilizing a fiber mixture of delta and round cross-sectional configuration.

11. A wipe material of claim 1, wherein the dry facing is treated with a wetting agent.

12. A wipe material of claim 11, in which the polyolefin fiber or fiber-like component of the dry facing is treated with an ethoxylated fatty acid ester.

* * * * *

UNITED STATES PATENT AND TRADEMARK OFFICE
CERTIFICATE OF CORRECTION

PATENT NO. : 4,837,078

DATED : JUNE 6, 1989

INVENTOR(S) : HARRINGTON

It is certified that error appears in the above-identified patent and that said Letters Patent is hereby corrected as shown below:

Column 1, Line 44

"(A0" should read --(A)--

Column 1, Line 47

"blende" should read --blended--

Column 1, Line 61

"internally-positione" should read --internally-positioned--

Column 2, Line 34

" "A" denotes " should read --"A" side denotes--

Column 2, Line 46

"internally-positione" should read --internally-positioned--

Column 2, Line 47

" C41' " should read --C'''--

Column 4, Line 7

"wt/ %" should read --wt. %--

Column 5, Lines 27, 28

"fiber-and/or" should read --fiber-web and/or--

UNITED STATES PATENT AND TRADEMARK OFFICE
CERTIFICATE OF CORRECTION

PATENT NO. : 4,837,078

DATED : JUNE 6, 1989

INVENTOR(S) : HARRINGTON

It is certified that error appears in the above-identified patent and that said Letters Patent is hereby corrected as shown below:

Column 5, Line 28

"fibrillated film-web" should read --fibrillated film--.

Signed and Sealed this

Sixth Day of March, 1990

Attest:

JEFFREY M. SAMUELS

*Attesting Officer*   Acting Commissioner of Patents and Trademarks